(12) United States Patent
Aan De Stegge et al.

(10) Patent No.: US 8,072,195 B2
(45) Date of Patent: Dec. 6, 2011

(54) VOLTAGE CONVERTER

(75) Inventors: Dennis Aan De Stegge, Ede (NL);
Hermanus Johannes Effing, Overasselt (NL); Henricus Cornelis Johannes Buthker, Mierlo (NL)

(73) Assignee: ST-Ericsson SA, Geneva (CH)

( * ) Notice: Subject to any disclaimer, the term of this patent is extended or adjusted under 35 U.S.C. 154(b) by 76 days.

(21) Appl. No.: 12/498,993

(22) Filed: Jul. 7, 2009

(65) Prior Publication Data
US 2010/0039086 A1 Feb. 18, 2010

(30) Foreign Application Priority Data
Jul. 7, 2008 (EP) .................................... 08159816

(51) Int. Cl.
*G05F 1/613* (2006.01)
*G05F 1/00* (2006.01)

(52) U.S. Cl. ........ 323/224; 323/222; 323/283; 323/284; 323/266

(58) Field of Classification Search ................. 323/222, 323/224, 283, 284, 266
See application file for complete search history.

(56) References Cited

U.S. PATENT DOCUMENTS

| | | | | | |
|---|---|---|---|---|---|
| 4,964,029 | A | * | 10/1990 | Severinsky et al. | 363/80 |
| 4,974,141 | A | * | 11/1990 | Severinsky et al. | 363/81 |
| 7,199,563 | B2 | * | 4/2007 | Ikezawa | 323/266 |
| 7,242,168 | B2 | * | 7/2007 | Müller et al. | 323/222 |
| 7,391,190 | B1 | * | 6/2008 | Rajagopalan | 323/271 |
| 7,619,400 | B2 | * | 11/2009 | Hagino | 323/287 |
| 7,786,712 | B2 | * | 8/2010 | Williams | 323/266 |
| 7,808,217 | B2 | * | 10/2010 | de Cremoux et al. | 323/222 |
| 2005/0218876 | A1 | | 10/2005 | Nino | |
| 2006/0273768 | A1 | | 12/2006 | Chen et al. | |
| 2007/0085520 | A1 | | 4/2007 | Ho | |

FOREIGN PATENT DOCUMENTS

EP 2 009 776 A1 12/2008

* cited by examiner

*Primary Examiner* — Shawn Riley

(57) ABSTRACT

A voltage converter connectable to a power source (PS) and a load (LD) provides a regulated output voltage (Vout) from a voltage (Vin) power source by switchable current paths including an inductive element (L). The voltage converter includes a plurality of switching elements for switching the current paths of the voltage converter as a forward-phase current path when the input voltage corresponds to the output voltage, as an up-phase current path when the input voltage is lower than the output voltage, and as a down-phase current path when the input voltage is higher than the output voltage. A central controller controls a switching state of the plurality of switching elements, a current sensing unit including a comparator for sensing a current flowing through at least one of the switching elements, and a plurality of processing units for processing the current sensing.

9 Claims, 6 Drawing Sheets

VOLTAGE CONVERTER

CROSS-REFERENCE TO RELATED APPLICATION(S)

This application claims the benefit under 35 U.S.C. §119 of European Patent Application No. EP 08159816.1 filed on Jul. 7, 2008, and which is incorporated herein by reference into the present disclosure as if fully set forth herein.

FIELD OF THE INVENTION

The present invention relates to a voltage converter, and in particular to a DC/DC-converter for delivering an output voltage which is higher or lower than an input voltage.

BACKGROUND OF THE INVENTION

Portable electronic devices, such as mobile phones or any hand-held computer in general need a regulated voltage even from an unregulated voltage source, for example a battery. For generating and maintaining for a predetermined operation period the required regulated voltage, a voltage regulator is used. The voltage regulator is often provided in the form of a DC/DC-converter which is operated by a power source, such as the battery and generates a DC output voltage. The output voltage may be produced at a higher or lower value than the input voltage according to the voltage to be used for supplying power to the mobile devices. For obtaining an output voltage that is higher than the input voltage, a so-called boost or step-up converter is utilized, and for obtaining a lower voltage level, a so-called buck or step-down converter is used.

Since the voltage provided by a battery may vary in a relative broad range from a fully charged status to a partly or completely discharged status, the voltage regulator is also required to provide a certain output voltage from a range of input voltages which may comprise higher and lower voltages as the specific input voltage of the DC/DC-converter.

The implementation of a voltage regulator, such as a DC/DC-converter is in general a switching regulator and includes a circuit that uses an energy-storage element, such as an inductor or coil, to transfer energy from the unregulated power source having a higher or lower voltage than desired, such as a battery with varying state of charge, and the temporarily stored energy is transmitted in discrete pulses to a load. In case a feedback circuitry is provided the energy transfer process can be set to a predetermined value and can be controlled for maintaining a basically constant output voltage at the load connected to the voltage converter.

In case the DC power source is in such a manner unregulated that the input voltage of the DC/DC-converter may be lower or higher than the desired output voltage, probably due to the considerably varying state of charge of the battery and, thus, of the output voltage thereof, an up and down converter (buck-boost) converter is required to provide a regulated output voltage from such a kind of source by regulating the output voltage to the predefined level depending upon the properties of the load connected thereto. The up-down converter provides a regulated output voltage over large variations of the unregulated voltage source providing the input voltage thereof, and control is needed to obtain desired output voltage results.

Reference United States 2005/0218876 A1 discloses a reversible buck-boost chopper circuit, wherein rectifier elements are provided in a first half-bridge circuit and a second half-bridge circuit. The first half-bridge circuit is connected to the power supply side and is also connected to an inductor forming the energy storage device. The second half-bridge circuit is connected to the inductor and to the output side of the chopper circuit to which the load is connected. Each of the first and second half-bridges includes semiconductor switching elements provided in the form of field effect transistors, and a central controller generates drive signals for controlling the switching status of the semiconductor switching elements of both half-bridges. The controller can provide drive signals to turn on and off at least one of the plural semiconductor switches of both half-bridges to obtain different output voltages. A first output voltage is applied to the high-side terminal of the load, and a second output voltage is applied to the low-side terminal of the load, thereby operating the load based on a differential voltage between the first and the second output voltages. The differential voltage defines a predetermined DC output voltage for the load. A current sensor is provided for sensing the current from the power source to the chopper circuit, and a voltage sensor is provided for sensing the output voltage of the chopper circuit applied to the load. This allows a current-feedback control and a voltage-feedback control so that over-current conditions are avoided and the load can be provided with a desired voltage level for operation. The chopper type DC/DC-converter has a reversible power-transmission capability and allows a voltage applied to the load to be generated by step-up or step-down process with respect to the DC voltage of the DC power source, based on the feedback control of the operational parameters.

Furthermore, FIG. 1 shows a basic arrangement of a DC/DC-converter or voltage converter 100 including an automatic up/down converting function for obtaining the required DC output voltage Vout for driving a load LD based on a DC input voltage Vin, probably taken from a power supply PS such as a battery connectable to the voltage converter 100. The voltage converter 100 is arranged to transfer electrical energy from the power supply PS which constitutes an unregulated voltage source having the voltage Vin at the terminal IN to a corresponding output voltage Vout to be supplied to a load LD connectable to the voltage converter 100. That is, the DC/DC-converter 100 is adapted for carrying out an automatic up/down mode and provides the regulated output voltage Vout for the load LD by switchable current paths including an inductive element L. A plurality of switching elements S1 to S4 is provided for switching the current paths of the voltage converter as a forward-phase current path when the input voltage corresponds to the output voltage, an up-phase current path when the input voltage is lower than the output voltage, and a down-phase current path when the input voltage is higher than the output voltage.

The voltage converter 100 includes in particular a first switching element S1, a second switching element S2, a third switching element S3 and a fourth switching element S4. The switching elements S1 to S4 may be provided in the form of field effect transistors and may specifically be implemented by using PMOST and NMOST power transistors. The present voltage converter 100 in the arrangement shown in FIG. 1 provides the automatic up/down conversion function by combining an up converter with a down converter using a single inductance element or inductor L (coil).

The single inductor L is connected in series to the first switching element S1. Between a common node of the first switching element S1 and the inductor L and the ground potential GND, the second switching element S2 is arranged. At the other node NB of the inductor L the third switching element S3 is connected between this node and ground potential GND, and the fourth switching element S4 is connected between this node NB and a capacitor C. The capacitor C is connected in parallel to the output terminals of the voltage converter 100 between the output voltage Vout and ground potential GND.

The voltage converter 100 further comprises a digital control circuitry CCU (central control unit) which provides control of the conversion operation of the voltage converter, and the digital control circuitry is in particular adapted for controlling the switching status (open or closed state) of the respective switching elements S1 to S4.

In general, voltage converters are current mode converters, which means that the current through the inductor L is sensed and switched to a different state when a peak of the current is reached.

Regarding the operation of the voltage converter 100 shown in FIG. 1, by selectively maintaining or changing the switching status of particular ones of the plurality of the switching elements S1 to S4 different current paths can be defined including the inductor (coil) L.

When the input voltage Vin which corresponds to a battery voltage Vbat when the voltage converter 100 is connected to a battery (not shown), is higher than the desired output voltage Vout (Vbat>Vout), then the fourth switch S4 is always closed and the first and second switches S1 and S2 are alternately switched on (that is, they are alternately switched to the conductive state). The current through the first switching element S1 is sensed representing the current through the inductor L, and when the current through the first switching element S1 reaches a peak, the first switching element S1 is switched off and the second switching element S2 is switched on and starts to conduct. This corresponds to the down mode for generating an output voltage Vout which is lower than the input voltage Vin (exhibiting the function of a buck converter).

In the up mode, that is, when the input voltage Vin which corresponds to the battery voltage Vbat is smaller than the desired output voltage Vout (Vin>Vout), the first switching element S1 is always closed (conductive), and switching is in a controlled manner performed between the third switching element S3 and the fourth switching element S4. In this mode, the third switching element S3 is the active switch, and the fourth switch S4 could be replaced with a passive diode. In this case, the current through the third switching element S3 is sensed, and the third switching element S3 is switched off, when a predetermined peak current is reached. The predetermined peak current may constitute a program peak current.

As mentioned above, depending upon the operation of the voltage converter, currents through the first switching element S1 and the third switching element S3 are sensed. Accordingly, a matching of the sensing of the current values is necessary for obtaining reliable current values for an optimized control of the voltage converter 100. Moreover, this measurement concept requires a certain circuitry rendering the circuit arrangement of the voltage converter 100 complicated.

SUMMARY OF THE INVENTION

It is therefore an object of the present invention to provide a voltage converter for supplying a desired output voltage with improved efficiency and with reduced complexity of the circuit arrangement.

According to the present invention, this object is accomplished by a voltage converter as set out in the appended claims.

According to the present invention the voltage converter that is connectable to a power source and a load and is adapted for providing a regulated output voltage from a voltage power source by switchable current paths including an inductive element, the voltage converter comprises: a plurality of switching elements for switching the current paths of the voltage converter as a forward-phase current path when the input voltage corresponds to the output voltage, an up-phase current path when the input voltage is lower than the output voltage, and a down-phase current path when the input voltage is higher than the output voltage, a central controller being adapted for controlling a switching state of the plurality of switching elements, a current sensing unit including a comparator for sensing a current flowing through at least one of the switching elements, and a plurality of processing units being adapted for processing sensing results of the current sensing unit, the processing being based on the sensed current flowing through the at least one switching element and being triggered by the comparator.

The voltage converter according to the present invention and as put forward in the appended claims provides a control concept which is therefore based on a current measurement at a predetermined position in the circuit arrangement of the voltage converter so that the control concept can reliably be based on this single current measurement. The current measurement represents the value of a current input to the voltage converter, and on the basis of which the desired output voltage can be obtained. The current detection or current measurement is performed in conjunction with one of the plurality of switching elements of the voltage converter, and hence only one switching element is involved in the current measurement so that any balancing or calibration process necessary in case of plural current measurements can be omitted. As only one circuitry for current measurement is used the complexity of the voltage converter can be reduced, and this also leads to a smaller current consumption. A reduced current consumption is important in case of an application of the voltage converter in any mobile devices.

Preferred embodiments of the present invention are defined in the dependent claims.

The current sensing unit may include a current source and a further switching element being adapted for generating a reference voltage to be fed to said comparator so that a precise sensing of the current can be ensured. Each of the processing units may include a latch circuit being connected to the comparator via a combinatorial logic. The latch circuits may store data of the different operation conditions of the voltage converter (that is, of the different phases).

The central controller may be adapted for generating reset signals to be fed to the latch circuits for resetting the latch circuits. This prevents multiple detections caused by noise.

The comparator may be adapted for sensing a voltage drop across the at least one switching element, and for comparing the voltage drop with the reference voltage. In this case, the active switching element can be used as a sense resistor, whereas a peak value can precisely be determined in comparison to the reference voltage.

Moreover, the central controller may be adapted for controllably setting the current source and controlling the switching state of said further switching element for obtaining said reference voltage which constitutes a predetermined voltage drop across the further switching element. Reliable determination of the reference voltage and a high detection precision can be obtained.

The comparator may be adapted for sensing a peak of the current flowing through the at least one switching element and corresponding to the current flowing through the inductive element. The comparator in this case functions as a current peak detector and provides the switching operation when the peak is detected, thereby defining the timing of the switching.

The present invention is further elucidated by the following Figures and examples, which are not intended to limit the scope of the invention. The person skilled in the art will understand that various embodiments may be combined.

BRIEF DESCRIPTION OF THE DRAWINGS

These and other aspects of the present invention will be apparent from and elucidated with reference to the embodiments described hereinafter. In the following drawings.

DETAILED DESCRIPTION OF THE INVENTION

Figure 1:
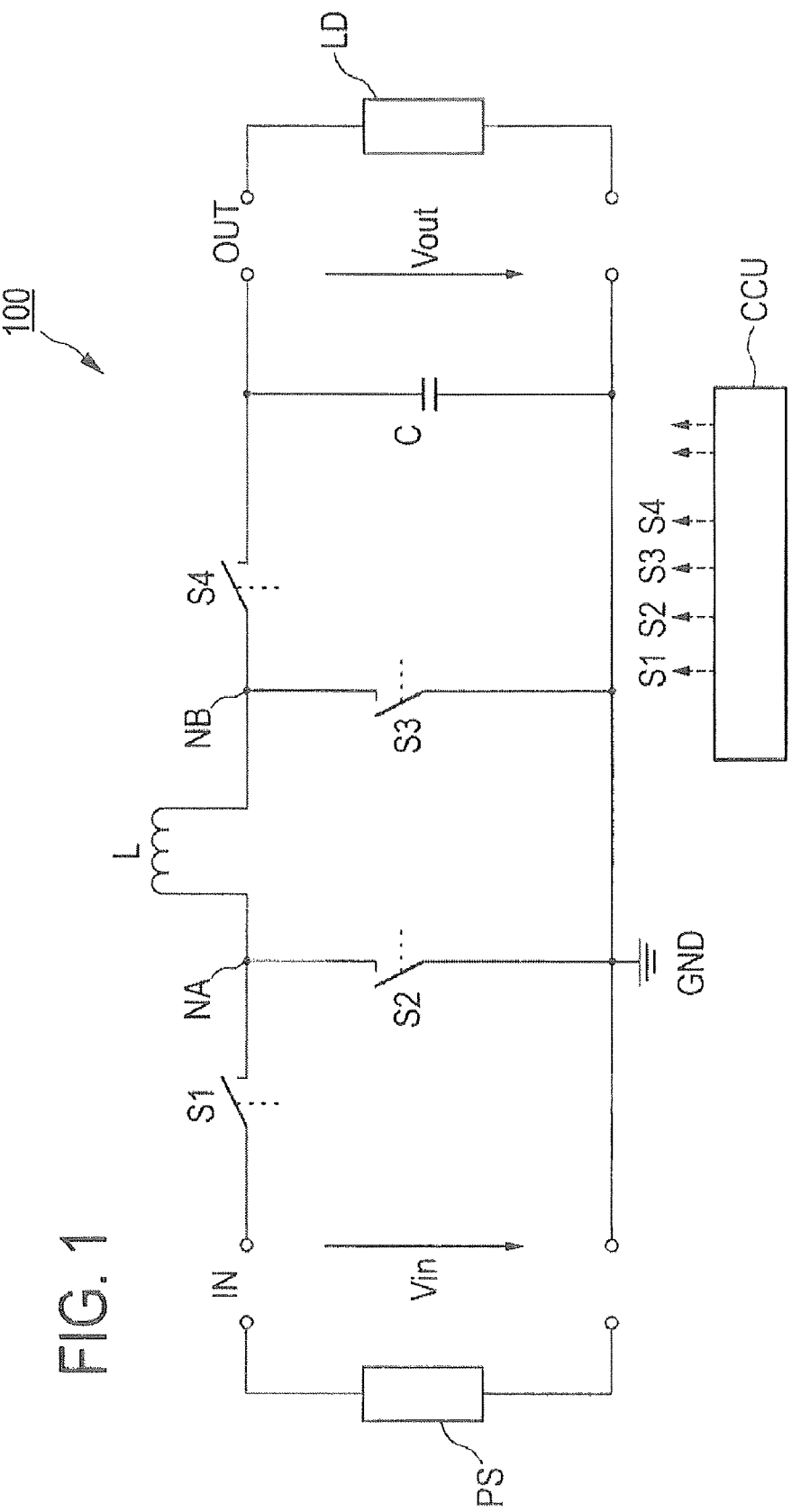
FIG. 1 shows a schematic overview of the general circuit arrangement of a voltage converter (DC/DC-converter) according to the present invention.

The basic circuit arrangement shown in FIG. 1 has been described above in conjunction with a general circuit arrangement of a voltage converter, such as an automatic up/down converter (DC/DC-converter) 100. The description of the preferred embodiments also makes reference to the arrangement shown in FIG. 1, and the same reference signs are used for identifying the same or corresponding circuit components.

It is in the following referred to the circuit arrangements shown in FIGS. 2 and 3 indicating the method and technology of sensing current in conjunction with particular switching elements, such as switching elements S1 and S3, as shown in FIG. 1.

Figure 2:
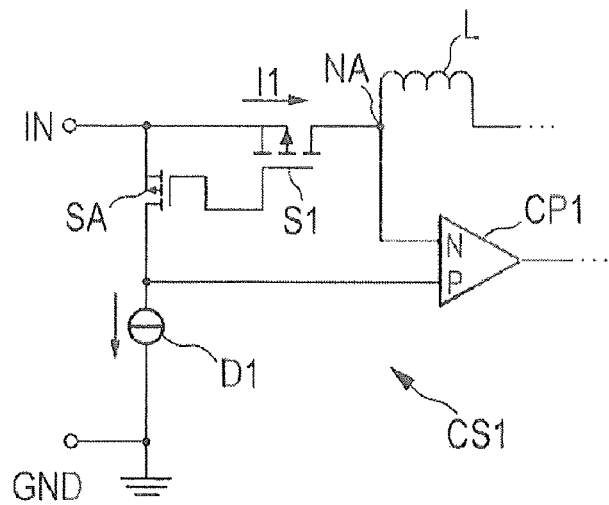
FIG. 2 shows a more detailed circuit arrangement of the sensing of the current through the first switching element S1 shown in FIG. 1.

Regarding FIG. 2, the circuit arrangement according to an embodiment of the present invention refers to a current sensing operation and the corresponding circuit components for sensing the current flowing through the first switching element S1. As can be seen from FIG. 2, at the input terminal IN of this circuitry the DC input voltage Vin which corresponds to a battery voltage Vbat of a battery (not shown) is applied. In a corresponding manner as shown in FIG. 1, the first switching element S1 is switched in series to an inductor or an inductive element (coil) L. To simplify the circuit arrangement of FIG. 2 for describing current sensing in conjunction with the first switching element S1, the further components of FIG. 1 are not shown in FIG. 2.

The current sensing function also senses the current flowing through the inductor L causing a magnetic field and an energy storage in the inductor L.

Switched in parallel to the input terminal IN (input voltage Vin) and the ground potential GND is a series connection of a further switching element SA and first a current DAC D1 (current digital-to-analogue converter). This current DAC D1 provides on the one hand a digital-to-analogue converter for converting digital signals into corresponding analogue signals, and provides on the other hand output currents which can be set to any value depending upon the operational range of the respective current DAC. In the present case control of the first current DAC D1 and specifically a setting thereof (current value) can be performed by a digital control circuitry which will be referred to hereinafter as the central controller CCU having the function of a central control means.

The circuit arrangement shown in FIG. 2 further includes a first comparator CP1 the negative input terminal of which being connected to a node NA connecting the first switching element S1 to the inductor L. The other positive input of the first comparator CP1 is connected to a node between the further switching element SA and the first current DAC D1. Furthermore, the gates of the first switching element S1 and of the further switching element SA are connected to each other.

Hence, the active switch, which is the first switching element S1 in the present case, is used as a sense resistor. The operation of the current sensing in conjunction with the first switching element S1 is described in the following, wherein the further switching element SA, first comparator CP1 and the first current DAC D1 constitute a first current sensing unit CS1.

When at the input terminal IN the input voltage Vin which may correspond to the battery voltage Vbat of a battery is applied to the voltage converter 100, and when the first switching element S1 is switched on, then a current I1 will flow through the first switching element S1 and the inductor L. The increasing inductor current I1 will cause an increasing voltage drop across the first switching element S1. The first current DAC D1 also functions as a reference current generator, and a corresponding reference current generated by the first current DAC D1 causes a similar voltage drop across the further switching element SA at the time of current sensing. Accordingly, the central controller CCU is adapted for controllably setting the current DAC D1 for obtaining the (detectable) voltage drop across the further switching element SA. The first comparator CP1 compares the two voltages at the respective nodes as mentioned above, and provides the peak detection and a switching function when the current I1 has reached its maximum value.

The first comparator CP1 may be provided in the form of a fast, low offset comparator.

By means of the circuit arrangement shown in FIG. 2 in conjunction with the sensing of the current through the first switching element S1, there is a current transfer ratio from the current of the first current DAC D1 to the inductor current I1.

Figure 3:
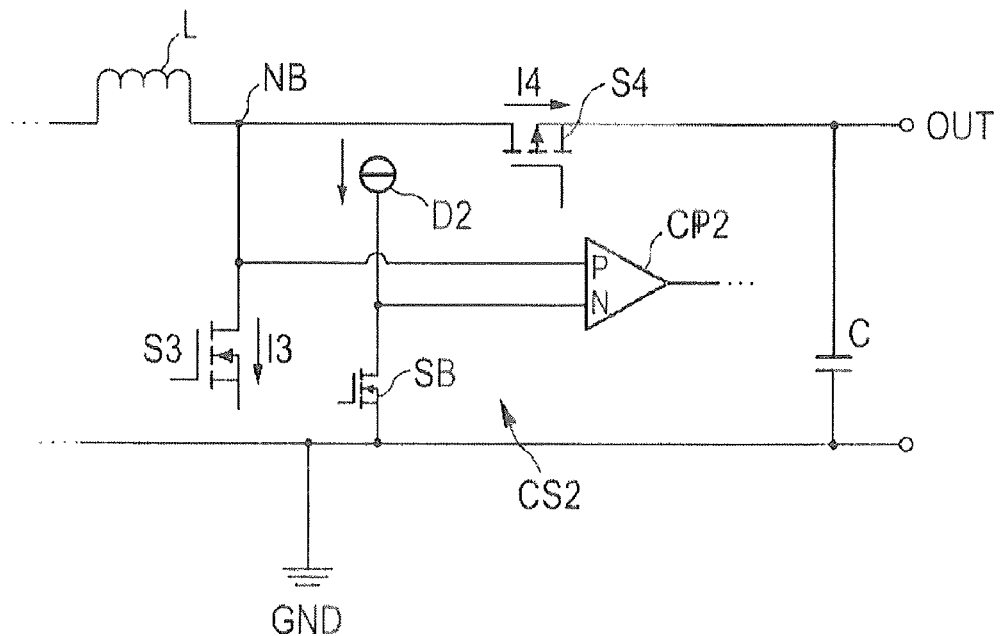
FIG. 3 shows a more detailed circuit arrangement of the sensing of the current through the third switching element S3 shown in FIG. 1.

In a similar manner a corresponding current measurement is carried out by the circuit arrangement shown in FIG. 3 in conjunction with the third switching element S3 which constitutes the active element in this case.

Between the other node NB of the inductor L and the ground potential GND the third switching element S3 is arranged. The node NB is further connected to the output terminal OUT via the fourth switching element S4 which basically remains conductive (switched-on). The fourth switching element S4 carries the fourth current I4 supplied to the output terminal OUT. The control of the switching status of the respective switching elements, as mentioned above in conjunction with FIG. 1, is performed by the central controller CCU (FIG. 1).

A second current DAC D2 is connected via a further switching element SB to ground potential GND.

For sensing voltage conditions in this circuit arrangement and, thus, for determining a maximum current flowing in the third switching element S3, a second comparator CP2 is provided the positive input terminal of which being connected to the potential of the node NB, that is, the potential between the third switching element S3 and the inductor L. The other (negative) input terminal of the second comparator CP2 is connected to a node between the second current DAC D2 and the further switching element SB connected to ground potential GND.

Between the output terminal OUT and the ground potential GND the capacitor C having the function of a smoothing capacitor, is arranged.

The sensing function of the current through the third switching element S3 is basically the same as the detection of the current flowing through the first switching element S1, wherein the further switching element SB, second comparator CP2 and the second current DAC D2 constitute a second current sensing unit CS2. The second comparator CP2 may also be provided as a fast, low offset comparator, and compares the two voltages at the predetermined positions in the circuitry.

The switching function is obtained when the current through the third switching element S3 which is the third current I3, has reached its maximum value, thereby defining the timing of the switching. A corresponding reference value for the second comparator CP2 is provided by the second current DAC D2 for performing a comparison process in conjunction with this reference value. Accordingly, the central controller CCU is adapted for controllably setting the second current DAC D2 for obtaining a (detectable) voltage drop across the further switching element SB. This corresponding voltage drop at the further switching element SB and constituting the reference voltage is fed to the second comparator CP2.

As described above, two current sensing processes are carried out depending upon the operation conditions of the voltage converter 100, and specifically upon the switching conditions (open or closed state) of the plurality of switching elements S1 to S4. The further switching elements SA (FIG. 2) and SB (FIG. 3) are operated in a controlled manner on the basis of the measurement and for providing the respective reference values, that is, the voltage drops constituting the reference voltages to obtain a precise comparison process.

The output signals of the first and second comparator CP1 and CP2 reflecting the occurrence of the maximum value of the respectively measured currents I1 and I3 are further evaluated for control purposes of the voltage converter 100.

Figure 4:
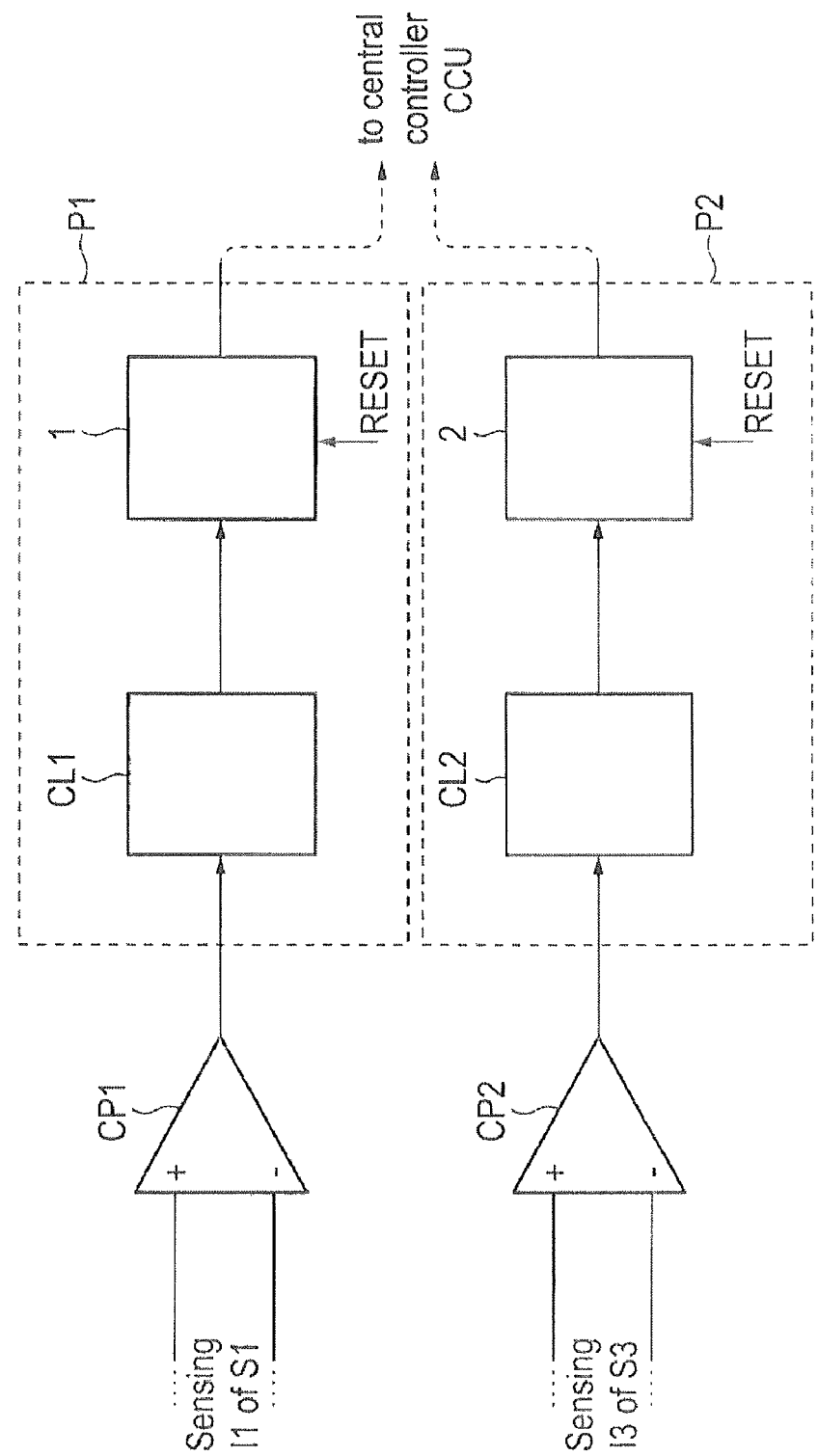
FIG. 4 shows a block circuit of an overall view of two current sensing paths, respectively involving the first and the second switching elements.

Specifically, as is shown in FIG. 4, the first comparator CP1 is connected to a first latch circuit 1 via a first combinatorial logic CL1 providing the adaptation between the first comparator CP1 and the first latch circuit 1. That is, the sensing result of sensing the first current I1 of the first switching element S1 by the first comparator CP1 is transmitted to the first latch circuit 1 for storing all the different phases, and the first latch circuit 1 is reset at the beginning of the next cycle. Resetting is controlled by the central controller CCU. As indicated in FIG. 4, the first combinatorial logic CL1 and the first latch circuit 1 constitute a first processing unit P1.

In a similar manner the sensing result of sensing the third current flowing through the third switching element S3 by the second comparator CP2 is transmitted to a second latch circuit 2 via a second combinatorial logic CL2 providing the adaptation between the second comparator CP2 and the second latch circuit 2. Resetting of a second latch circuit 2 is also performed at the beginning of the next cycle. As indicated in FIG. 4, the second combinatorial logic CL2 and the second latch circuit 2 constitute a second processing unit P2.

The resetting of the first and second latch circuits 1 and 2 prevents multiple detections caused by noise.

The structure shown in FIG. 4 depicts that each above-described portion of the voltage converter 100 has one latch circuit (that is, triggers one latch) that determines the state of this portion of the voltage converter 100. The complete up/down voltage converter 100 has the two latch circuits 1 and 2 (or Set-Reset flip-flops).

The operation of the voltage converter 100 having the structure and function as described above and carrying out a current detection (detection of peak values of the current through the inductor L) ensures a reliable detection of the actual operating conditions and specifically the switching conditions of the voltage converter 100 so that by means of the central controller CCU the operation of the voltage converter 100 can be feedback controlled to obtain the desired output voltage for driving the load LD connected to the voltage converter 100.

The circuit arrangement shown in FIG. 4 also indicates that the specific data temporarily stored in both latch circuits 1 and 2 is fed to the central controller for further data evaluation and for carrying out the necessary control process. This results in a reliable control of the entirety of the voltage converter 100 and a precise setting of the desired (regulated) output voltage Vout to be supplied to the load LD connected to the voltage converter 100.

Figure 5:
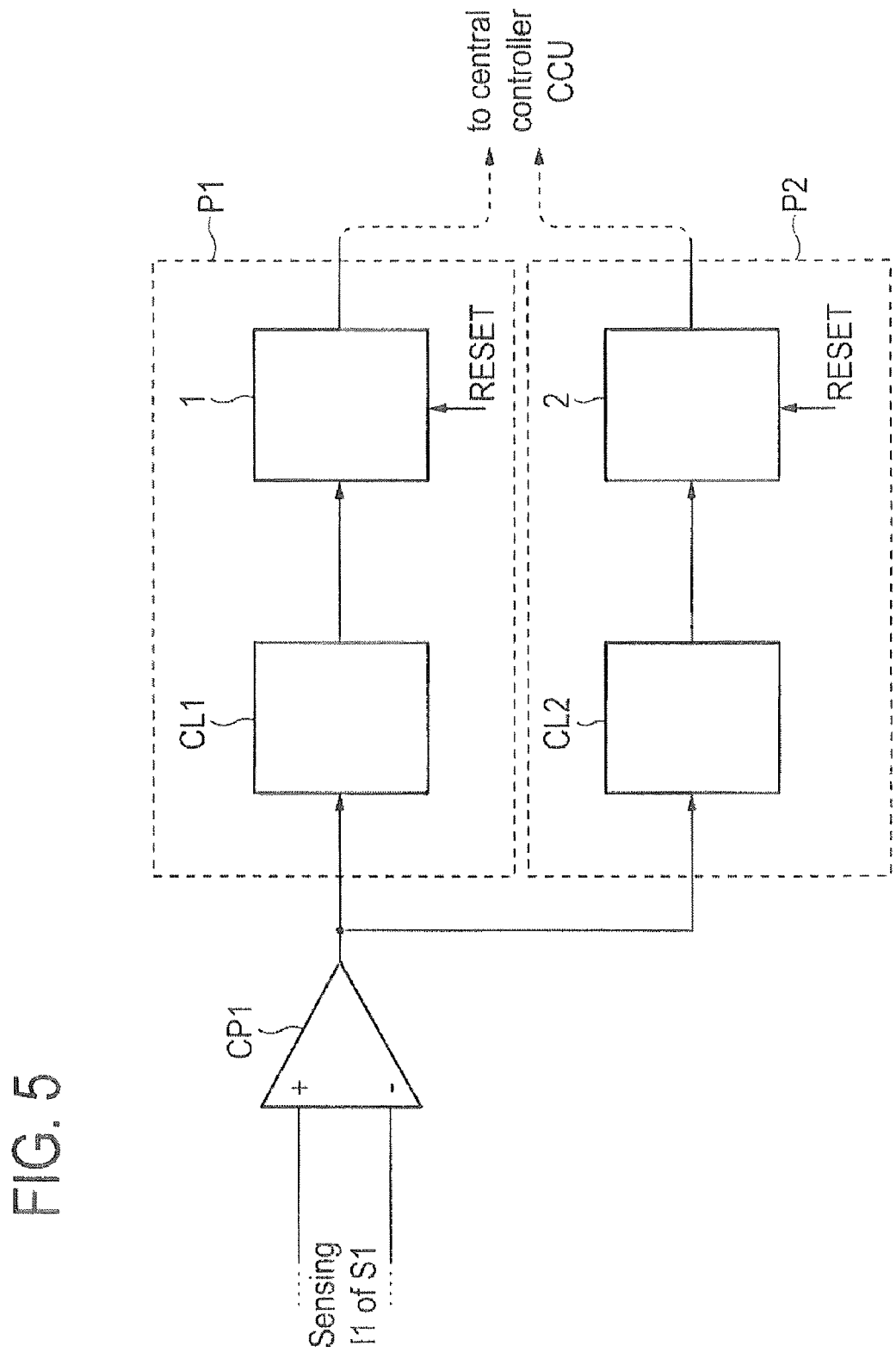
FIG. 5 shows a block circuit of an overall view showing a single current sensing path.

FIG. 5 shows a part of the voltage converter 100 according to a further embodiment of the present invention having a modified circuit arrangement for current sensing and corresponding further processing of the sensing result.

In the circuit arrangement shown in FIG. 4 having two current sensing comparators CP1 and CP2 current is sensed at two different switching elements, such as the first switching element S1 and the third switching element S3 out of the plurality of switching elements S1 to S4 of the voltage converter 100.

Regarding current sensing at two different switching elements, it is to be noted that the plural switching elements S1 to S4 (power transistors) and the further switching elements SA and SB (smaller transistors) of the voltage converter 100 may be provided in the form of PMOST and NMOST transistors. In an operation region of the voltage converter 100 where the input voltage Vin which corresponds to the battery voltage Vbat is about the desired output voltage Vout (Vbat≈Vout), then both the first and second comparators CP1 and CP2, that is, both peak current comparators can switch.

The transfer ratio from the current of the respective current DAC D1 and D2 to the inductor current (current through the inductor L) should be identical for correct operation. So the ratios of the drain-source resistance (when switched-on) RDSon of the power MOST and sensed MOST should be identical. This is very difficult to guarantee, as the small transistors (further switching elements SA and SB) are not close to the power transistors of the respective switching elements of the plural switching elements S1 to S4. The matching in ratios is usually not better than about 10%.

Furthermore, the two comparators CP1 and CP2 for detecting a current peak may have a different input of the voltage, which can also cause problems in the so-called "auto mode", where the battery voltage Vbat (input voltage Vin) basically corresponds to the output voltage Vout (Vbat≈Vout). Both the first and second comparators CP1 and CP2 can be calibrated, but this requires a high effort and is expensive and time-consuming.

Accordingly, as is shown in FIG. 5, a single current measurement is carried out using the circuit arrangement as shown in FIG. 2 and indicating the current measurement of the first current I1 through the first switching element S1.

In contrast to the arrangement shown in FIG. 4, the sensing result processed in the first (and only) comparator CP1 is distributed, via corresponding combinatorial logic CL1 and CL2 to the first and second latch circuits 1 and 2. That is, both latch circuits 1 and 2 are triggered by one and the same comparator (first comparator CP1 of FIGS. 2 and 5) and use the same information. Similarly, the latch circuits 1 and 2 of FIG. 5 are also reset at the beginning of the next cycle to avoid multiple detection caused by noise. Hence, in contrast to the first embodiment, the voltage converter 100 still comprises the two latch circuits 1 and 2 for temporarily storing the detected state of the respective portion of the voltage converter 100, but these latch circuits 1 and 2 are only triggered by one single comparator CP1 for detecting the peak current (maximum value thereof) of the first current I1 flowing through the first switching element S1. First and second processing units P1 and P2 depicted in FIG. 5 are defined as above in conjunction with FIG. 4.

The current detection by means of the first comparator CP1 in conjunction with the current detection of the first switching element S1 (FIG. 2) is performed since in both the down mode and the up mode of the operation of the voltage converter 100 (that is, when an up-phase current path or a down-phase current path is switched) the current through the inductor L flows through the first switching element S1 during the active phase.

The detection of only the current flowing through the first switching element S1 and the inductor L during the active phase of the voltage converter 100 exhibits the same advantages as the complete circuit arrangement shown in FIG. 4 and described above in conjunction with the first embodiment of the present invention. That is, a reliable peak of the inductor current (first current I1) can be detected and the corresponding latch circuits 1 and 2 can be triggered or operated by this information to obtain a reliable current detection and, thus, a precise control of the voltage converter 100 even in case the desired output voltage Vout basically coincides with the input voltage Vin which corresponds to the battery voltage Vbat. A proper adaptation of the output voltage Vout to the desired voltage for driving the load LD connectable to the voltage converter 100 can be obtained with reduced complexity of the circuit arrangement and with less calibration and setting effort of the circuitry portions of the voltage converter 100.

According to further advantages of the simplified circuit arrangement using only the current sensing process of the first switching element S1 (FIG. 2), the current ratios for the PMOS and NMOS transistors need not to be exactly matched anymore. Furthermore, the offset of the comparator (in the present case of the first comparator CP1 shown in FIG. 2) is not very important as any calibration of plural comparators is not necessary. Due to the reduced complexity of the circuit arrangement and omitted further components (such as the current sensing components of the current sensing unit CS2 as shown in FIG. 3) the current consumption of the entire voltage converter 100 can be kept smaller.

The automatic up/down converter (voltage converter 100) provides the desired output voltage even in case of basically equal input voltage Vin and output voltage Vout in a precise manner this output voltage with high efficiency.

Figure 6A:
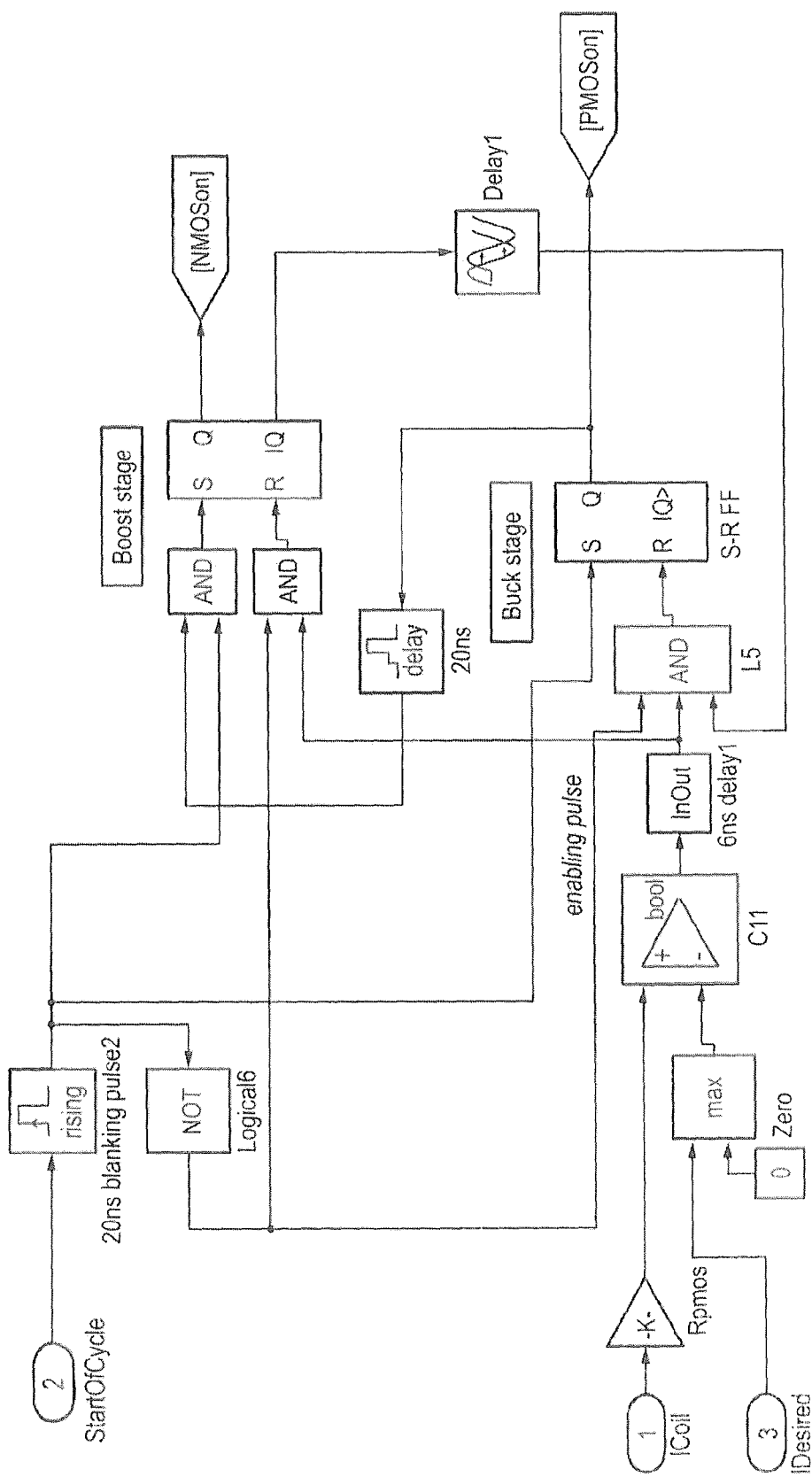
FIG. 6A shows a graphical representation of a SIMULINK schematic of a single current comparator with glue logic.
Figure 6B:
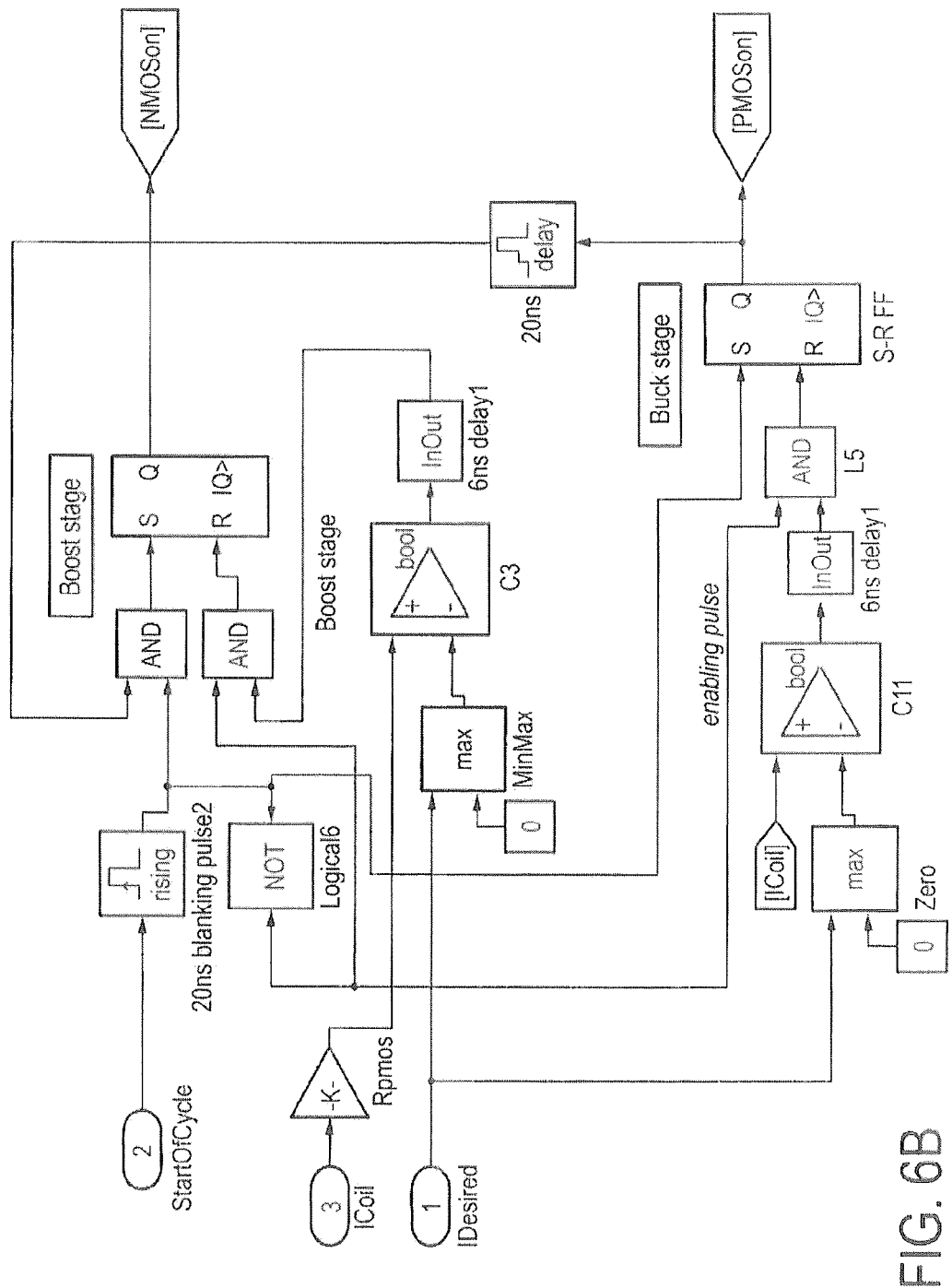
FIG. 6B shows a corresponding SIMULINK schematic of a circuit arrangement having a double comparator with glue logic.

The further FIGS. 6A and 6B show a schematic arrangement of a simulation of the voltage converter 100 with a single current detection (FIG. 6A) and a double current detection (FIG. 6B), that is, with a single peak current comparator with glue logic, and a double comparator with glue logic. Glue logic forms custom electronic circuitry provided to obtain an adaptation between two or more different integrated circuits (interface function).

Regarding the SIMULINK schematics of FIGS. 6A and 6B, the amount of logic gate is identical. In the case of FIG. 6B, only a delay is added and one AND gate has an extra input. The inputs of the circuit are still the voltage across the PMOS transistor, represented by the "ICoil" input, and the set point, represented by "IDesired". There are some enabling inputs in the real circuit, but these enabling inputs are not essential for the understanding of the present invention.

The outputs are still the PMOS and NMOS gate drive signals.

After the start of a cycle, there is a blanking delay off, in this example, 20 ns. It can be more or less depending upon the speed of the comparators. During this delay, the latch circuits are fixed in their "set" position.

The setting of the boost stage flip-flop is conditional: it can only be set when the buck stage flip-flop was not set.

The comparators are modeled with a 6 ns delay. This is, however, not essential for the present invention.

The voltage converter according to the present invention and specifically having the structure as described in conjunction with both embodiments above exhibits a precise control and a reliable output voltage according to the desired driving voltage of any load, and the present invention can be applied in automatic up/down converters for use in any mobile devices, such as mobile phones for Solid State Flash (NOKIA), and in portable MP3 players for hard Disc Drive supply (such as Apple iPod), or any other use in mobile devices for industry applications or for customers where different precisely controlled output voltages based on varying input voltages are to be provided for a plurality of loads requiring different drive voltages.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Any reference signs in the claims should not be construed as limiting the scope.

What is claimed is:

1. A voltage converter, connectable to a power source and to a load, for providing a regulated output voltage from a voltage power source by switchable current paths including an inductive element, the voltage converter comprising:

a plurality of switching elements being adapted for switching said current paths of said voltage converter as a forward-phase current path when said input voltage corresponds to said output voltage, an up-phase current path when said input voltage is lower than said output voltage, and a down-phase current path when said input voltage is higher than said output voltage;

a central controller being adapted for controlling a switching state of said plurality of switching elements;

a current sensing unit including a comparator being adapted for sensing a current flowing through only one switching element of said switching elements; and a plurality of processing units being adapted for processing sensing results of said current sensing unit, said processing being based on said sensed current flowing through said at least one switching element and being triggered by said comparator;

wherein said current sensing unit includes a current source and a further switching element being adapted for generating a reference voltage to be fed to said comparator; and wherein said central controller being adapted for controllably setting said current source and controlling the switching state of said further switching element for obtaining said reference voltage.

2. The voltage converter according to claim 1, wherein each of said processing units includes a latch circuit being coupled to said comparator via a combinatorial logic.

3. The voltage converter according to claim 2, wherein said central controller being adapted for generating reset signals to be fed to said latch circuits for resetting said latch circuit.

4. The voltage converter according to claim 1, wherein said comparator being adapted for sensing a voltage drop across said at least one switching element, and for comparing said voltage drop with said reference voltage.

5. The voltage converter according to claim 1, wherein said comparator being adapted for sensing a peak of the current flowing through said at least one switching element and corresponding to the current flowing through said inductive element.

6. The voltage converter according to claim 1, wherein only one switching element of the switching elements is involved in the current sensing.

7. The voltage converter according to claim 6, wherein only the comparator being adapted to sense the current flowing to the one switching element is distributed to the first latch circuit and the second latch circuit via corresponding combinatorial logic.

8. The voltage converter according to claim 1, wherein the comparator comprises a peak current comparator.

9. The voltage converter according to claim 8, wherein the peak current comparator comprises a peak current comparator with glue logic.

* * * * *